United States Patent [19]

Huggins

[11] Patent Number: 4,833,317

[45] Date of Patent: May 23, 1989

[54] OPTICALLY POWERED RESOLVER

[75] Inventor: Raymond W. Huggins, Mercer Island, Wash.

[73] Assignee: The Boeing Company, Seattle, Wash.

[21] Appl. No.: 92,682

[22] Filed: Sep. 3, 1987

[51] Int. Cl.⁴ .............................................. H01J 3/14
[52] U.S. Cl. .............................. 250/237 G; 250/227; 250/231 SE; 341/13; 341/14
[58] Field of Search ................. 250/227, 231 SE, 551, 250/237 G; 307/311; 350/96.1; 455/602, 610, 612; 341/13, 14

[56] References Cited

U.S. PATENT DOCUMENTS

| | | | |
|---|---|---|---|
| 3,461,384 | 8/1976 | Bayati et al. | 324/96 |
| 4,291,976 | 9/1981 | McMahon | 250/227 |
| 4,321,474 | 3/1982 | Tanaka et al. | 250/551 |
| 4,356,395 | 10/1982 | Miller | 250/227 |
| 4,362,358 | 12/1982 | Hafle | 250/227 |
| 4,363,061 | 12/1982 | Vaerewyck et al. | 361/31 |
| 4,419,586 | 12/1983 | Phipps | 250/551 |
| 4,430,572 | 2/1984 | Eve et al. | 250/551 |
| 4,456,903 | 6/1984 | Kishi et al. | 340/54 |
| 4,564,770 | 1/1986 | Sherman et al. | 307/311 |
| 4,565,924 | 1/1986 | Misumi et al. | 250/227 |
| 4,568,834 | 2/1986 | Sherman | 250/551 |
| 4,570,079 | 2/1986 | Davis | 307/311 |
| 4,588,883 | 5/1986 | Abbas | 250/205 |
| 4,588,896 | 5/1986 | Abbas | 250/213 A |
| 4,651,571 | 3/1987 | McGlade | 250/227 |

OTHER PUBLICATIONS

D. R. Patriquin et al., "Optically Interfaced Sensor System for Aerospace Applications," ISA Paper #86-0110, 1986, pp. 117-124.

Primary Examiner—Edward P. Westin
Assistant Examiner—Khaled Shami
Attorney, Agent, or Firm—Christensen, O'Connor, Johnson & Kindness

[57] ABSTRACT

An optically powered resolver for detecting an optical property of an encoder at a plurality of encoding sites on the encoder, to permit determination of the position or other state of the encoder. Each encoding site is capable of receiving an optical encoder input signal and of modulating the encoder input signal to produce an optical encoder output signal. The resolver includes a photocell for converting the optical input signals into corresponding electrical input signals, and an energy storage circuit for storing a portion of the energy of the electrical input signals. The resolver also includes an interrogation circuit for interrogating a selected encoding site with an encoder input signal in response to the receipt of an optical input signal by the resolver. Interrogation means provides an optical output signal corresponding to the resulting encoder output signal. The interrogation circuit sequentially changes the selected encoding site as optical input signals are received, and the resolver preferably operates without any external source of electrical power.

19 Claims, 3 Drawing Sheets

OPTICALLY POWERED RESOLVER

FIELD OF THE INVENTION

The present invention relates to optically powered resolvers, and in particular, to a resolver that is capable of sequentially interrogating a plurality of encoding sites and that requires no outside source of electrical power.

BACKGROUND OF THE INVENTION

Optical digital resolvers commonly comprise a resolver disc or slide with a multiplicity of digital tracks, and arrays of optical sources and detectors positioned adjacent the tracks. The sources and detectors are arranged so that each track is independently interrogated. For each track, an optical source provides an optical encoder input signal to a particular encoding site on the encoder member, and the encoding site modulates the optical signal to produce an encoder output signal. The encoder output signal from each detector is typically either high or low, depending upon when the bit being interrogated is a 1 or a 0. Resolvers typically operate with either a transmission or a reflection geometry, and the information is transmitted either continuously, or by time division multiplexing.

For many resolver applications, such as a hazardous or EMI prone environment, it is desirable that the resolver be electrically passive, i.e., it is desirable that the resolver does not require any external electrical power. Although such resolvers have been proposed in the past, such proposals have included a separate fiber for transmitting optical power to each track, and involved considerable optical complexity within the resolver itself. Wavelength division multiplexing has been demonstrated as a method for reducing the number of fibers between the resolver and the signal processing electronics, but this technique requires a complicated optical system within the resolver.

SUMMARY OF THE INVENTION

The present invention provides an optically powered resolver for detecting an optical property of an encoder at a plurality of encoding sites on the encoder, to thereby permit determination of the position or other state of the encoder. In a preferred arrangement, the resolver of the present invention operates without any external source of electrical power.

Each encoding site on the encoder is capable of receiving an optical encoder input signal, and of modulating the encoder input signal to produce an optical encoder output signal. The resolver includes input means, energy storage means and interrogation means. The input means receives a series of optical input signals, and includes photocell means for converting the optical input signals into corresponding electrical input signals. A portion of the energy of the electrical input signals is stored in the energy storage means. The interrogation means interrogates a selected encoding site with an encoder input signal in response to the receipt of an optical input signal by the resolver. The interrogation means provides an optical output signal corresponding to the resulting encoder output signal, and preferably includes means for sequentially changing the selected encoding site as optical input signals are received. Thus in response to a plurality of optical input signals, the resolver provides a plurality of optical output signals that contain information concerning the position or other state of the encoder.

In one preferred embodiment, the resolver derives electrical power solely from the energy storage means, and the interrogation means includes a plurality of illumination devices positioned adjacent the respective encoding sites. In this embodiment, coupling means are provided for coupling electrical input signals to selected ones of the illumination devices, to thereby cause each selected illumination device to provide an encoder input signal to the adjacent encoding site. In a second embodiment, means are provided for coupling each optical input signal to all of the encoding sites, photodetectors respectively positioned adjacent the encoding sites for receiving the encoder output signals and converting them into corresponding electrical output signals, and coupling means for coupling a selected one of the electrical output signals to an optical source for providing the optical output signal.

DETAILED DESCRIPTION OF THE INVENTION

Figure 1:
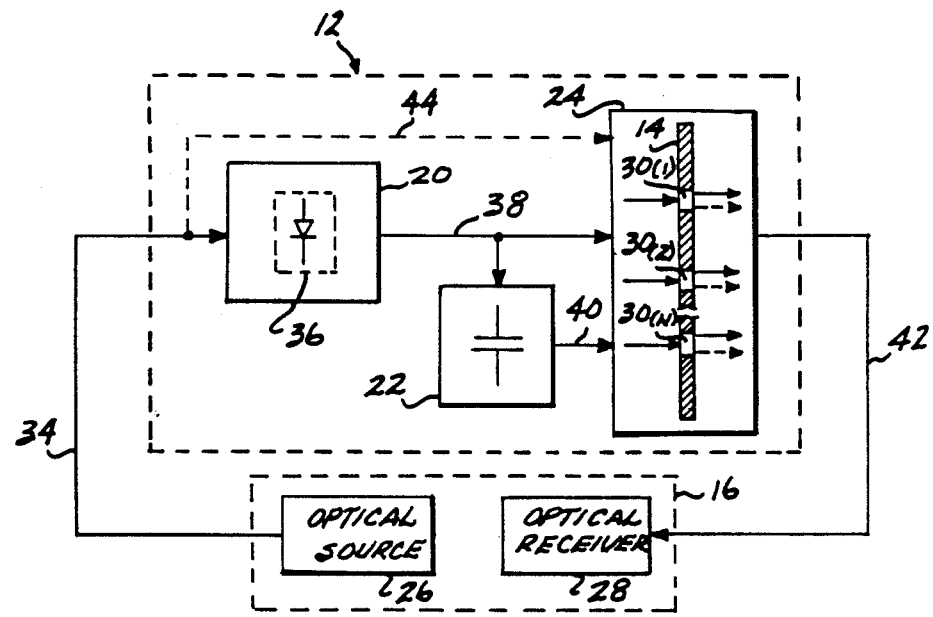
FIG. 1 is a block diagram illustrating the general arrangement of the optically powered resolver of the present invention.

FIG. 1 illustrates a general arrangement for the user of the optically powered resolver of the present invention. In the illustrated system, resolver 12 is provided for reading encoder 14 under the control of signal processing unit 16. The signal processing unit includes optical source 26 and optical receiver 28. Resolver 12 comprises input stage 20, energy storage device 22 and interrogation system 24. Encoder 14 includes a plurality (N) of encoding sites designated by reference numeral 30(1) through 30(N).

Each encoding site is capable of receiving an optical encoder input signal, and a modulating the encoder input signal to produce an optical encoder output signal. In a digital resolver, each encoding site will typically modulate the encoder input signal in one of two distinguishable ways to produce the encoder output signal. For example, each encoding site may either transmit or not transmit the incident light. Modulation in one of three or more ways is of course also possible. In an analog resolver, the modulation provided by each encoding site will cover a continuous range of an optical parameter such as a transmission coefficient. In general, any light modulation technique can be used, so long as it produces output states that can be distinguished from one another. In FIG. 1, the encoder input signals are designated by the arrows immediately to the left of each encoding site 30, and the encoder output signals are designated by the solid and phantom arrows to the right of each encoding site. The solid and phantom encoder output signal arrows symbolize the two (or more) distinguishable ways in which the encoder output signal can be produced.

In operation, optical source 26 of signal processing unit 16 produces a series of optical input signals (e.g., a series of optical pulses) on fiber optic cable 34 that are received by input stage 20. Input stage 20 includes photocell 36 that converts each optical input signal on fiber optic cable 34 into a corresponding electrical input signal on line 38. A portion of the energy of the electrical input signals is stored in energy storage device 22, and the resulting stored energy is used to provide electrical power to interrogation system 24 via line 40. Each time that an electrical signal appears on line 38, the interrogation system interrogates one of the encoding sites, and couples the resulting encoder output signal to fiber optic cable 42. The output signal on fiber optic cable 42 is returned to optical receiver 28 of signal processing unit 16.

Interrogation system 24 includes means for selecting a new encoding site for interrogation each time that an electrical input signal appears on line 38. In a preferred embodiment, the interrogation system for N encoding sites interrogates each encoding site once for each N electrical input signals produced by the input stage. In some embodiments, the encoder input signals utilized by interrogation system 24 could be derived directly from the optical input signals on line 34, instead of from the electrical input signals on line 38. This possiblity is symbolized by phantom line 44 that directly couples fiber optic cable 34 to the interrogation system.

Figure 2:
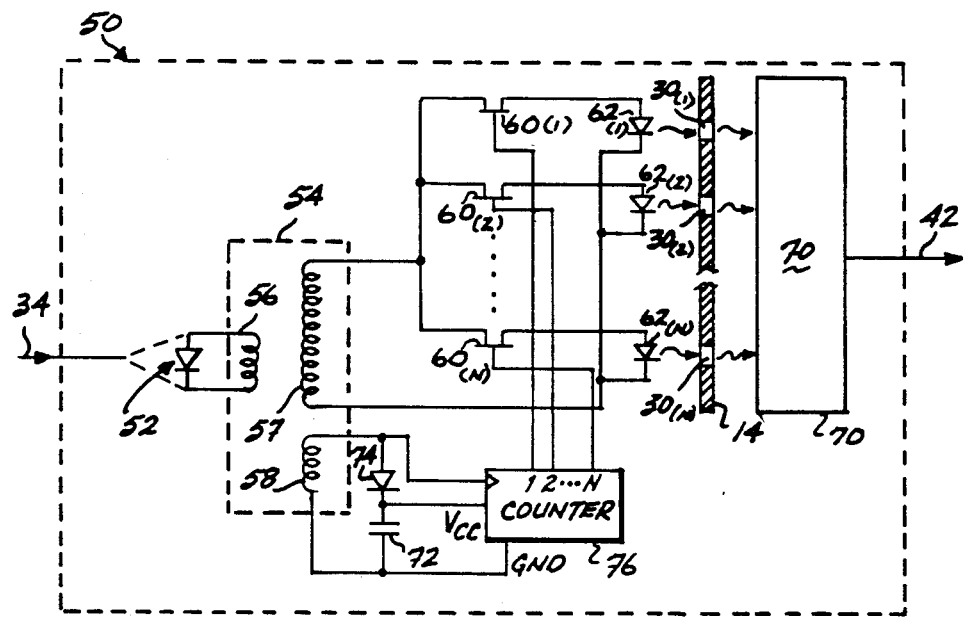
FIG. 2 is a circuit diagram showing one preferred embodiment of the resolver.

Further details of one preferred embodiment of the invention are illustrated by resolver 50 of FIG. 2. Resolver 50 comprises photocell 52, transformer 54, a plurality of switches 60(1) through 60(N), a plurality of LEDs 62(1) through 62(N), optical combiner 70, capacitor 72, diode 74 and counter 76. Each of switches 60 is serially connected to a corresponding LED 62, and the LED is positioned adjacent to a corresponding encoding site 30. The switches include gate (i.e., control) terminals that are connected to the N output terminals of counter 76. Transformer 54 includes primary winding 56 and secondary windings 57 and 58. Primary winding 56 is connected to photocell 52, and the photocell is in turn positioned adjacent to the end of fiber optic cable 34.

A typical voltage available from a photocell is 0.5 volts. Transformer 54 steps this voltage up to a higher voltage level (e.g., 2–3 volts) in its secondary windings sufficient for powering the remaining components of the resolver. Secondary winding 57 of transformer 54 is connected to each of switches 60, and to the cathodes of LEDs 62. Secondary winding 58 is coupled across an energy storage circuit comprising diode 74 and capacitor 72, and to the clock and ground inputs respectively of counter 76. Each optical input pulse on fiber optic cable 34 results in electrical input pulses on secondary windings 57 and 58. The pulse on secondary winding 57 is used to power one of LEDs 62, as described below. The pulse on secondary winding 58 causes electrical energy to be stored in capacitor 72, and provides a clock pulse for counter 76. The node between diode 74 and capacitor 72 is connected to the positive voltage supply terminal of counter 76. Counter 76 counts the pulses appearing at its clock input terminal, decodes its stored count value, and provides a switch actuation signal on a corresponding one of its N output terminals.

In operation, resolver 50 receives a series of optical input pulses on fiber optic cable 34. At any given time, counter 76 will provide a switch actuation signal to the gate terminal of one of switches 60, e.g. switch 60(i), thereby closing that switch. Each optical pulse appearing on fiber optic cable 34 results in electrical pulses on secondary windings 57 and 58 of transformer 54. The pulse on secondary winding 57 is coupled through switch 60(i) to LED 62(i), resulting in the interrogation of encoding site 30(i) with the optical pulse from LED 60(i). The resulting encoder output pulse passes through optical combiner 70, and appears as an output signal on fiber optic cable 42. The electrical pulse appearing on secondary winding 58 adds further charge to energy storage capacitor 72, and provides a clock pulse to the counter that causes its count to advance by one, so that the next optical input pulse will interrogate encoding site 30(i+1). Thus, a series of N input signals on fiber optic cable 34 will result in the interrogation in each of the N encoding sites 30, and will provide a series of N output pulses on fiber optic cable 42 that will permit determination of the position or other state of encoder 14.

Figure 3:
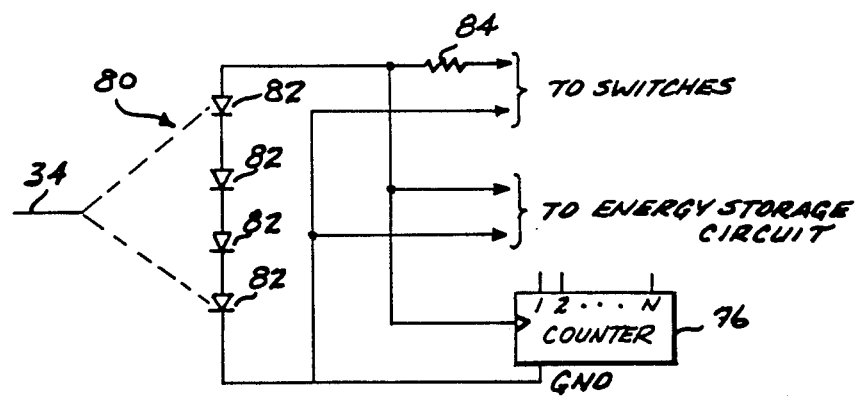
FIG. 3 is a partial circuit diagram showing a variation of the embodiment of FIG. 2.

An alternate embodiment of resolver 50 is partially illustrated in FIG. 3. In this embodiment, a series connected array 80 of photocells 82 is utilized instead of a transformer. By using a suitable number of photocells in array 80, the array can directly generate a voltage sufficient to operate the interrogation circuit. Thus as shown in FIG. 3, the electrical signals produced by array 80 are sent directly to the switches, to the energy storage device, and to counter 76. A suitable geometry for array 80 would be a disk divided into four 90° sectors, since the optical arrangement required to produce approximately equal illumination on each solar cell would then be particularly simple. The voltage developed across the array will be approximately 2 volts, and this voltage is applied across each LED 62. LEDs typically require between 1.5–1.8 volts for operation. Resistor 84 may be provided in series with the switches and LEDs, for stability.

The efficiency of a solar cell embodiment, such as that shown in FIG. 3, is on the order of 0.1 percent. Thus a total optical power of 1 mW incident on array 80 will cause each LED to emit approximately 1 $\mu$W. Experience suggests that the optical pulse launched into the output fiber optic cable 42 should be at least 10 $\mu$W, which means that with a coupling efficiency between the LED and the fiber of 10%, the LEDs in the interrogation system should radiate about 100 $\mu$W of optical energy. The power incident on photocell array 80 should therefore be at least 100 mW, which means that optical source 26 (typically a laser or LED) should emit close to one watt. Such powers are not practical if the powering device is a semiconductor operating in a CW mode. However when operated in a pulse mode, peak powers approaching a watt can readily be obtained from an LED, and peak powers of tens of watts can be obtained from a laser diode. It is therefore apparent that except under carefully controlled laboratory conditions, where the coupling eficiencies and the device/fiber interfaces can be optimized, operation in pulsed mode is key to practical operation. On the other hand, if the restriction of semiconductor powering is removed, the powering device could be a laser that is capable of emitting powers of a watt or more in a CW mode, such as a diode laser array, a CW Nd: YAG laser, or a high powered gas laser. Nevertheless, it would be necessary to provide a series of discrete optical signals on fiber optic cable 34, to permit synchronization of the interrogation means with the signal processing unit. Because of the properties of transformers, of course, the embodiment of FIG. 2 can only be operated in a pulsed mode.

With the embodiment of FIG. 2 or 3, synchronization could be provided by an additional LED that does not illuminate any of the encoding sites, i.e., an output pulse will always be present. The pulse applied to this LED could be of a different length, or the LED peak wavelength could be different from the wavelength of the LEDs that illuminate the encoding sites. It will be appreciated, however, that the LED switching logic described above could be more comprehensive, and that the synchronization signal could be embedded in the pulse train applied to the LED array, thus eliminating the need for an LED specifically for synchronization purposes.

Figure 4:
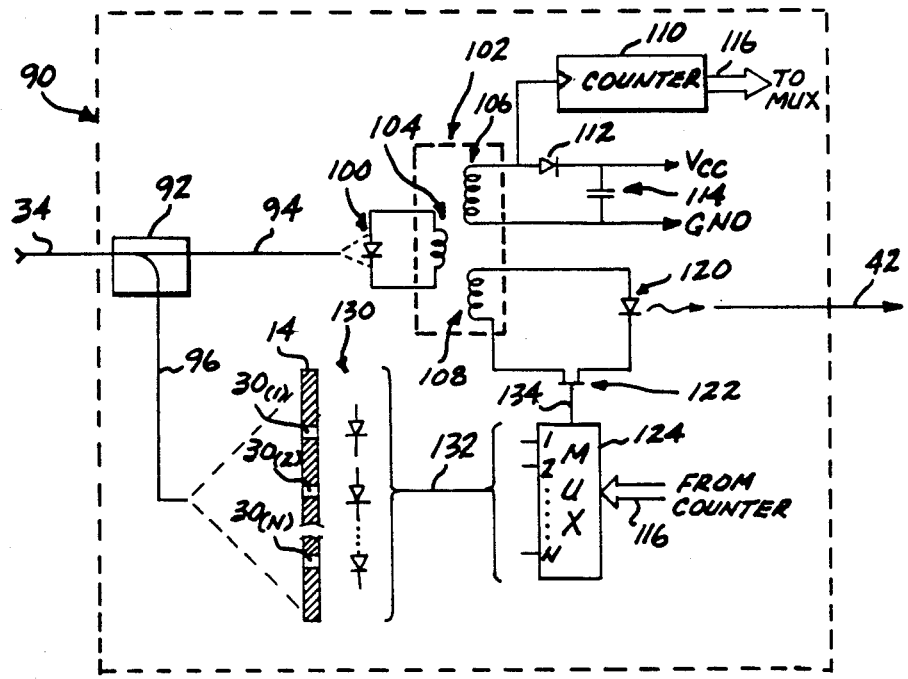
FIG. 4 is a circuit diagram showing a second preferred embodiment of the present invention.

A third embodiment of the present invention is illustrated by resolver 90 of FIG. 4. Resolver 90 includes transformer 102, counter 110, output LED 120, multiplexor (MUX) 124 and photodetector array 130. Each optical input signal received via fiber optic cable 34 is divided by power divider 92 between fiber optic cables 94 and 96. Optical pulses on fiber optic cable 94 illuminate photocell 100 that is coupled to primary winding 104 of transformer 102. The resulting pulses on secondary winding 106 are coupled to the clock input of counter 110, and to an energy storage device comprising diode 112 and capacitor 114. Capacitor 114 in turn provides power to the other components of the resolver. As with the embodiment of FIGS. 2 and 3, counter 110 counts the pulses appearing on the transformer secondary winding. However in FIG. 4, the resulting count is encoded into a parallel, digital signal on lines 116 that forms a channel select input signal for multiplexer 124, as described below. Each optical pulse on fiber optic cable 94 also results in an electrical pulse on secondary winding 108 of transformer 102. This pulse is applied across the series connection of output LED 120 and switch 122.

An optical pulse appearing on fiber optic cable 96 is directed onto all of the encoding sites 30 of encoder 14. Photodetector array 130 is positioned on the opposite side of encoder 14, such that the N individual photodetectors of the array are positioned adjacent to the respective encoding sites. The N photodetectors are individually coupled by lines 132 to the N inputs of MUX 124. MUX 124 couples one of lines 132 to its output terminal that in turn is connected to the gate of switch 122 via line 134. The particular one of lines 132 that is coupled to line 134 depends upon the channel select signal on lines 116.

In operation, an optical input pulse on fiber optic cable 34 will result in the illumination of all of encoding sites 30, and will cause an electrical pulse to appear across secondary winding 108. The photodetector corresponding to a selected one of the encoding sites will be coupled by MUX 124 to the gate of switch 122. At this time, the electrical pulse appearing across secondary winding 108 may cause output LED 120 to emit a pulse of light into fiber optic cable 42, depending upon the state of switch 122, i.e., depending upon the state of the selected encoding site. A short time later, the electrical pulse appearing across secondary winding 106 will increment the count stored by counter 110, and thus select a different encoding site via MUX 124 for the next optical input pulse.

Figure 5:
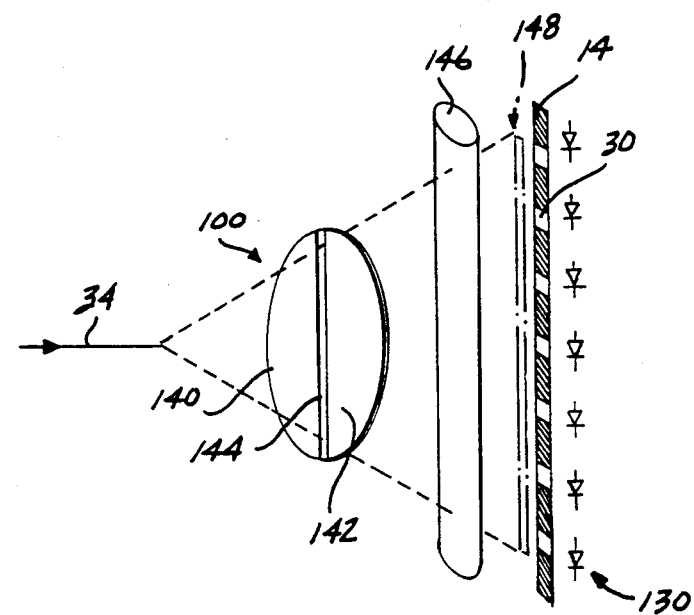
FIG. 5 is a schematic perspective view showing the illumination of a solar cell and an encoder from a single fiber optic cable.

A preferred method for coupling an optical pulse from fiber optic cable 34 onto photocell 100 and encoding sites 30 is illustrated in FIG. 5. In this arrangement, photocell 100 is formed as a disk that is cut along a diameter, and the two semicircular portions 140 and 142 are then slightly displaced from one another to form a narrow slit 144. Light passing through slit 144 is focused by cylindrical lens 146 to a narrow slit image 148 that illuminates the encoding sites of encoder 14. Alternatively, if photocell 100 can be located in close proximity to encoder 14, the cylindrical lens can be eliminated. It will be appreciated that other optical configurations are possible using optical fiber couplers and splitters.

While the preferred embodiments of the invention have been illustrated and described, variations will occur to those skilled in the art. For example it will be appreciated that an analog encoder could be implemented, provided that each encoding site were capable of modulating the optical input signal over a range of ways to produce an optical output signal. In an encoder where the optical parameter was an analog value such as the absolute reflection or transmission coefficient of an encoding site, it will in general be necessary to have a reference level so that losses in the fibers coupling the encoder to the signal processing unit can be taken into account. The concepts described above for the multitrack encoder can be adapted to alternately transmit the reflection or transmission coefficient of the encoder and a reference level back to the signal processing unit. Accordingly, the invention is not to be limited to the specific embodiments described and illustrated above, and the scope of the invention is instead to be determined by reference to the following claims.

The embodiments of the invention in which an exclusive property or priviledge is claimed are defined as follows:

1. An optically powered resolver for detecting an optical property of an encoder at a plurality of encoding sites, to thereby permit determination of the the position or other state of the encoder, each encoding site being capable of receiving an optical encoder input signal and of modulating the encoder input signal to produce an optical encoder output signal, the resolver comprising:
    input means for receiving a series of optical input signals, the input means comprising photocell means for converting the optical input signals into corresponding electrical input signals;
    energy storage means for storing a portion of the energy of the electrical input signals; and
    interrogation means for interrogating a specific encoding site selected from the plurality of encoding sites, with an encoder input signal in response to the receipt of an optical input signal by the resolver, and for providing an optical output signal corresponding to the resulting encoder output signal, the interrogation means including means for sequentially changing the specific selected encoding site as optical input signals are received;
    whereby a plurality of optical output signals provides information concerning the position or other state of the encoder.

2. The resolver of claim 1, wherein the interrogation means derives electric power solely from the energy storage means.

3. The resolver of claim 1, wherein the interrogation means sequentially changes the selected encoding site each time that an optical input signal is received.

4. An optically powered resolver for detecting an optical property of an encoder at a plurality of encoding sites, to thereby permit determination of the position or other state of the encoder, each encoding site being capable of receiving an optical encoder input signal and of modulating the encoder input signal to produce an optical encoder output signal, the resolver comprising:

input means for receiving a series of optical input signals;

energy storage means for storing electrical energy;

photocell means coupled to the input means for converting the optical input signals into corresponding electrical input signals;

means for storing a portion of the energy of the electrical input signals in the energy storage means;

a plurality of illumination devices respectively positioned adjacent the plurality of encoding sites;

coupling means for coupling electrical input signals only to selected ones of the plurality of illumination devices, to thereby cause each selected illumination device to provide an encoder input signal to the adjacent encoding site; and means responsive to the resultant encoder output signal for providing an optical output signal corresponding thereto;

whereby a plurality of optical output signals provides information concerning the position or other state of the encoder.

5. The resolver of claim 4, wherein the coupling means comprises means for sequentially changing the selected illumination device as optical input signals are received.

6. The resolver of claim 5, wherein the coupling means derives electrical power solely from the energy storage means.

7. The resolver of claim 4, wherein the coupling means comprises a plurality of switches, each switch including a control terminal, each switch being serially connected to one of the illumination devices and being adapted to close when a switch actuation signal is received at the control terminal, the coupling means further comprising means for coupling each electrical input signal to each switch, and counter means including means for storing a count value, means for modifying the count value as electrical input signals are received, a plurality of output terminals connected to the respsective control terminals of the switches, and means for providing the switch actuation signal at the output terminal corresponding to the stored count value.

8. The resolver of claim 7, wherein the coupling means derive electrical power solely from the energy storage means.

9. The resolver of claim 7, wherein the counter includes a clock input terminal, and wherein the coupling means includes means for coupling each electrical input signal to the clock input terminal.

10. The resolver of claim 4, further comprising a transformer coupling the photocell means to the energy storage means.

11. The resolver of claim 7, further comprising a transformer having a primary winding and first and second secondary windings, the primary winding being coupled to the photocell means for receiving the electrical input signals, the first secondary winding being coupled to the switches, the second secondary winding being coupled to the energy storage means and to the counter means.

12. An optically powered resolver for detecting an optical property of an encoder at a plurality of encoding sites, to thereby permit determination of the position or other state of the encoder, each encoding site being capable of receiving an optical encoder input signal and of modulating the encoder input signal to produce an optical encoder output signal, the resolver comprising:

input means for receiving a series of optical input signals;

energy storage means for storing electrical energy;

photocell means coupled to the input means for converting the optical input signals into corresponding electrical input signals;

means for storing a portion of the energy of the electrical input signals in the energy storage means;

illumination means coupled to the input means for directing a portion of each optical input signal onto each encoding site, thereby providing an encoder input signal to each encoding site;

a plurality of photodetectors positioned to receive the encoder output signals from the respective encoding sites, each photodetector being adapted to produce an electrical output signal corresponding to the encoder output signal;

an optical source; and coupling means for coupling only selected ones of the plurality of the electrical output signals to the opical source, to thereby convert each selected electrical output signal to an optical ouput signal;

whereby a plurality of optical output signals provide information concerning the position or other state of the encoder.

13. The resolver of claim 12, wherein the coupling means comprises means for sequentially changing the selected electrical output signal as optical input signals are received.

14. The resolver of claim 13, wherein the coupling means derives electrical power solely from the energy storage means.

15. The resolver of claim 12, wherein the coupling means comprises a switch comprising a control terminal and means for closing and coupling the electrical input signals to the optical source when a switch actuation signal is received at the control terminal, counter means including means for storing a count value, means for modifying the count value as electrical input signals are received, and means for providing a channel select signal corresponding to the stored count value, and multiplexer means responsive to the channel select signal for coupling a selected one of the photodetectors to the control terminal of the switch.

16. The resolver of claim 12, further comprising a transformer coupling the photocell means to the energy storage means.

17. The resolver of claim 15, further comprising a transformer having a primary winding and first and second secondary windings, the primary winding being coupled to the photocell means for receiving the electrical signals, the first secondary winding being coupled to the optical source and the switch, the second secondary winding being coupled to the energy storage means and to the counter means.

18. The resolver of claim 12, wherein the photocell means is positioned to be illuminated by the optical input signals and includes a slit therein, the encoder being positioned to receive illumination passing through the slit, the plurality of photodetectors being positioned on the opposite side of the encoder from the slit.

19. The resolver of claim 18, further comprising a cylindrical lens between the photocell means and the photodetectors, for focusing the light passing through the slit along one axis.

* * * * *